UNITED STATES PATENT OFFICE.

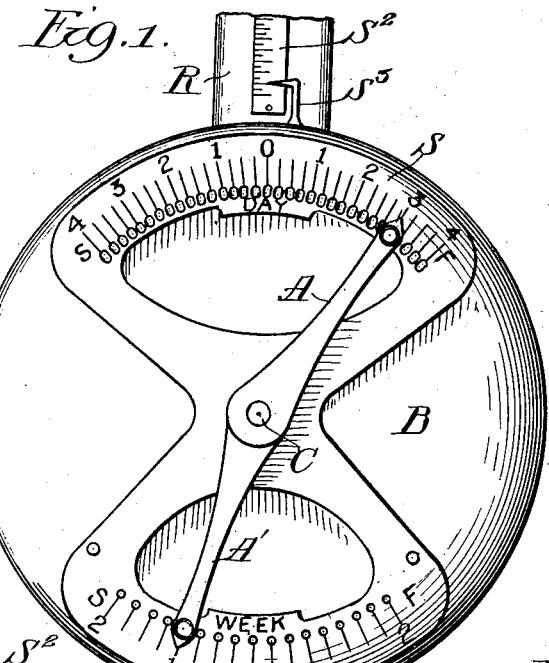
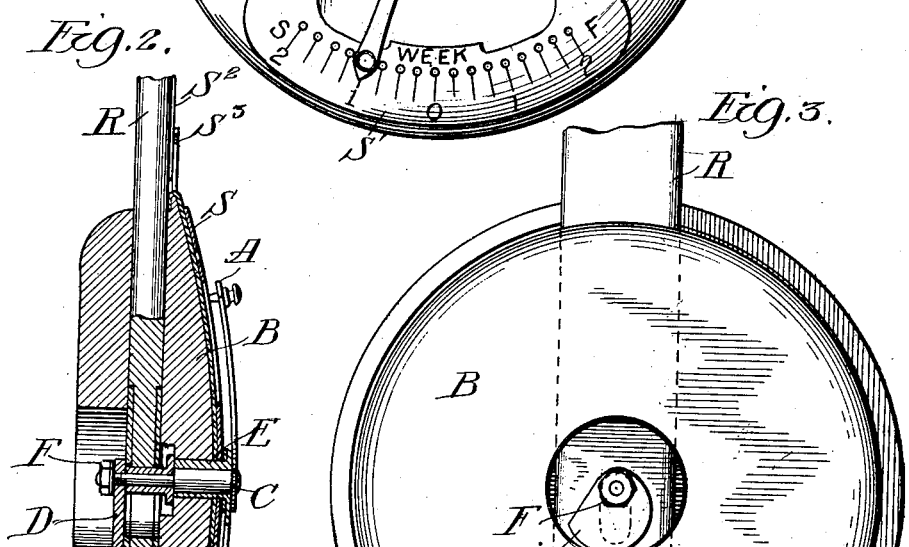

WALTER J. EVANS, OF CHICAGO, ILLINOIS.

LENGTH-ADJUSTER FOR PENDULUMS.

1,071,611.   Specification of Letters Patent.   Patented Aug. 26, 1913.

Application filed March 21, 1910. Serial No. 550,601.

*To all whom it may concern:*

Be it known that I, WALTER J. EVANS, a citizen of the United States of America, and a resident of Chicago, county of Cook, and State of Illinois, have invented certain new and useful Improvements in Length-Adjusters for Pendulums, of which the following is a specification.

My invention relates to pendulums for clocks, and has for its object improvements in devices for adjusting the lengths of the pendulum so as to regulate the clock.

In the accompanying drawings Figure 1 is a front elevation of the bob of a pendulum with a part of the rod upon which it is suspended; Fig. 2 is a vertical central section of the same; Fig. 3 is a partial rear elevation, and Fig. 4 is a section showing the eccentric used for small adjustments.

In the said drawings, the rod is represented by R and the bob by B. In the center of the bob is a pin C which goes through an eccentric sleeve E, which sleeve is in a bearing in the bob B. On the rear end of the pin C is a cam D held in place by a nut F. The cam D engages a pin P on the rod R. On the front end of the pin C is an arm A secured thereto, and by means of which the cam may be adjusted. The arm A is of flexible and resilient material, or, in other words, it is a spring arm. The outer end of said arm has a pin on its inner face, which is adapted to engage in any one of a series of holes in a scale marked S, shown at the upper part of Fig. 1. This scale is graduated opposite each of the holes and this scale indicates the position at which the arm A is held, and consequently the position of the cam D in its engagement upon the pin P. By moving the arm A either to the right or left the cam D is moved on the pin P so as to raise or lower the bob B on the rod R. The graduations on the scale S are so related to the movement produced by the cam that the graduations indicate the change in the length of the pendulum as measured in time as minutes for a longer unit of time as a day. Thus when the arm A is located at the zero point at the center of the scale if the clock is running one minute a day too slow the arm may be moved to the right over to the graduation marked "1", the effect of which will be to shorten the pendulum enough to make the clock run one minute faster in one day. If the clock needs more than one minute of adjustment, then the arm A will be advanced correspondingly. The graduation shown represents graduations amounting to variations of one-quarter of a minute per day, the word "Day" being placed adjacent to this scale to indicate the amount of adjustments that are produced thereon. The sleeve E is secured to another arm $A^1$ which is adapted to sweep over another scale $S^1$. As this sleeve E is in the form of an eccentric the movement of the arm $A^1$ will raise or lower the pin C in the bob B, the effect of which would be to change the position of the bob with respect to the pin P upon which the cam D rests. As a consequence of this construction, the eccentric sleeve E is a second means of adjusting the pendulum length. The adjustments made by the eccentric E are much smaller than those made by the cam D, and the amount of adjustment made by moving the arm A is determined by graduations on the scale $S^1$. As indicated in the drawings, these graduations are in minutes per week. Thus assuming that the arm $A^1$ is in the position shown in the drawings, then if the clock should run one-fourth of a minute too slow a movement of the arm A from the position in which it now is so that the pin thereon should engage the next adjacent hole the effect of the adjustment would be to shorten the pendulum sufficiently to make the clock run one-fourth of a minute faster than the week before. The arm $A^1$ is also a spring arm and has a pin thereon to engage holes in the scale $S^1$.

It will be evident from the previous description that there are two ways of adjusting the length of the pendulum, either of which will serve to lengthen or shorten the pendulum producing the corresponding result of making the clock run slower or faster according to which adjustment is made. Also that one of these adjustments is a comparatively coarse adjustment consisting of changes of minutes and fractions of a minute in a day of time. The other adjustment is a comparatively fine adjustment consisting of regulating the clock by changing its speed in minutes or fractions of a minute in a week of time. It will also be obvious that a unit of time may be other than that of a day or week, and in cases of extremely fine adjustments the adjustments may be fractions of a minute in a period of a month of time.

While I have shown my device as mounted upon a bob of a pendulum, and I generally prefer to use it in that way, it will be quite evident that I might apply the same compound adjustment at the upper end of the pendulum and thereby raise or lower the pendulum as necessity requires.

Instead of making the scale of adjustments on the arcs over which the arms A and A¹ move, I may, if I choose, place a scale on the pendulum rod R as shown at S² and add a small pointer S³ to the bob for indicating the rise and fall of the bob by moving either the arm A or A¹. This scale placed in this way may be graduated with any degree of fineness and may, for convenience, be marked to represent the inches in length of the theoretical pendulum, or may be marked in any other manner for the purpose desired. The numbering of this scale is not shown, as in this case it will depend upon what particular kind of numbering is desired. When used in connection with the registering scales S and S¹ it will probably be convenient to number them in inches of the length of the pendulum, but when used without the other scales it may be made to represent variations in minutes or fractions of a minute in a unit of time as a day.

What I claim is:

1. In an adjustment for pendulum lengths, the combination of two independently acting devices on the same axis for raising and lowering a bob, and a lockable registering device for indicating the amount of adjustment of the bob so made in minutes or fractions thereof in a unit period of time as a day or week.

2. An adjustment for pendulum lengths consisting of two parts on a common center, one part of which serves in making relatively large adjustments, and the other part which serves in making relatively small adjustments, and devices for indicating the amount of each adjustment.

3. An adjustment for pendulum lengths consisting of two parts on the same center, one part for coarse adjustments and the other part for fine adjustments, registers for indicating the amount of adjustment of each part, and devices for securing the adjustments thus made.

4. In an adjustment for pendulum lengths, a device for raising and lowering a pendulum bob, a register for indicating the amount of movement in time per day, and a second adjusting device on the same center and acting independently of the first named device, and a register for indicating the amount of movement by the last named device in time per week.

5. An adjustment for pendulum length, consisting of a bob with coarse and fine adjusting means on the same axis.

6. The combination with the rod and bob of a pendulum, of two independently operable devices on the bob for adjusting same on the rod, said devices being arranged for producing coarse and fine adjustments, an independent arm for each device, and a graduated scale for each arm.

7. The combination with a pendulum and two independently operable devices located to move about a common center for adjusting its length so as to vary the time of its movement, of a registering scale for indicating the amount of such adjustments, said scale being so graduated as to indicate the adjustments in fractions of a minute in some unit of time.

8. In a pendulum adjustment, a cam for adjusting the length of the pendulum, an arm by which said cam is moved, an eccentric for making small adjustments in the position of said cam independently of said arm, and a second arm by which said eccentric is moved.

9. In a pendulum adjustment, a cam for coarse adjustments, an eccentric for fine adjustments, and a pair of flexible and resilient self-locking arms by which said cam and eccentric are independently adjusted.

10. In a pendulum adjustment a cam for making coarse adjustments of the bob of the pendulum, an eccentric for making fine adjustments of the bob of the pendulum, a pair of independently operable flexible and resilient arms by which said cam and eccentric are moved, and a scale for indicating the amount of adjustment, said scale and arm being arranged to engage each other by the resilient action of the arm to hold said arm at its adjustment.

Signed at Chicago, Ill. this 19th day of March 1910.

WALTER J. EVANS.

Witnesses:
C. L. REDFIELD,
WALTER H. REDFIELD.

Copies of this patent may be obtained for five cents each, by addressing the "Commissioner of Patents, Washington, D. C."